May 19, 1959  A. R. LUBERSKY ET AL  2,887,022
MACHINE FOR SETTING UP CARTONS
Filed Aug. 20, 1956  9 Sheets-Sheet 1

Fig. 1

INVENTOR.
Albert R. Lubersky &
William H. Wilcox
BY
Attorneys

INVENTOR.
Albert R. Lubersky &
William H. Wilcox
BY
Attorneys

May 19, 1959  A. R. LUBERSKY ET AL  2,887,022
MACHINE FOR SETTING UP CARTONS
Filed Aug. 20, 1956  9 Sheets-Sheet 9

INVENTOR.
Albert R. Lubersky &
BY  William H. Wilcox

Attorneys

United States Patent Office 2,887,022
Patented May 19, 1959

2,887,022

MACHINE FOR SETTING UP CARTONS

Albert R. Lubersky, Mill Valley, and William H. Wilcox, Stockton, Calif., assignors to Fibreboard Paper Products Corporation, a corporation of Delaware Application August 20, 1956, Serial No. 604,945

12 Claims. (Cl. 93—53)

This invention relates to a machine for setting up cartons or for forming flat carton blanks into cartons having a bottom, two side walls and two end walls. The machine herein disclosed is particularly designed for setting up cartons in which the side and end walls are attached by interlocking tabs and includes improved means for insuring positive interlocking of the tabs. However, there are many features of the machine that can be used advantageously on cartons that are adhesively or otherwise secured in their set-up condition so the invention should not be taken as limited to use on any particular type of carton blank.

An object of the invention is to provide a machine that operates to receive a flat carton blank, set it up and discharge it without releasing it at intermediate times and thus to eliminate any possibility of the blank losing its position of perfect register with any of the mechanical parts which act upon it.

Another object is to provide a machine with an improved mechanism for indexing a rotary head which carries the carton being formed from one station to another and advances the carton radially outwardly of the head at timed intervals which mechanism includes a Geneva movement or other intermittent drive in combination with a cam drive and differential to accomplish the required indexing and advancing movement.

A further object of the invention is to provide a carton setting-up mechanism with a forming head which has hinged side wall members or wings to set the carton walls up, tucking fingers supported on the wings to insure interlock of tabs associated with said walls and a novel drive associated with said fingers to vary their timing with respect to the carton walls and insure a positive interlock.

A still further object is to provide means for easy and rapid interchangeability of parts required for adapting the machine for operation on cartons of different sizes.

Still further objects and advantages of the invention and the manner in which it is carried into practice are made apparent in the following specification by reference to the accompanying drawings in which the invention is disclosed in detail.

Figure 1:
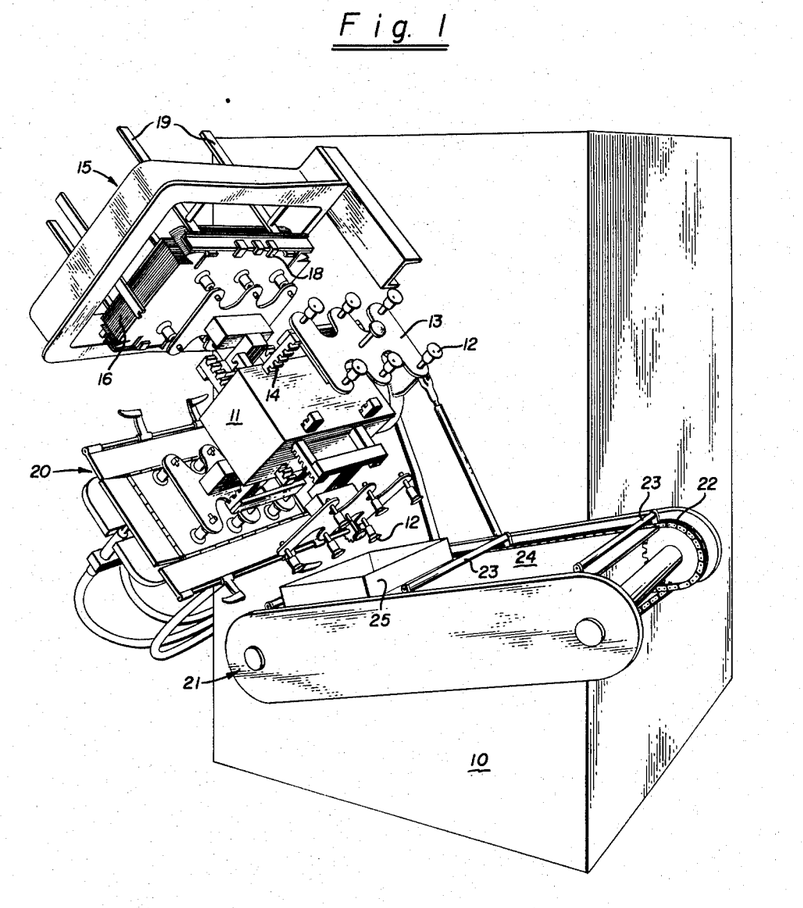
Fig. 1 is a perspective view of a carton setting-up machine embodying the present invention.

In Fig. 1 of the drawings, the machine of the present invention is illustrated as having a main case 10 for enclosing the driving mechanism to be described. On the front face of case 10, a rotary head 11 of square cross-section carries sets of suction cups 12 on each of its four sides carried upon plates 13 each supporting a battery of six such cups. More or less cups may be used depending upon the size of the carton. These plates 13 are supported on rack bars 14, two for each plate, extending through the head 11 and reciprocable with relation thereto. A hopper, generally indicated at 15, carries a stack or supply 16 of flat carton blanks which are retained against falling from the bottom of the hopper by small fingers 18 so that the blanks may be withdrawn one at a time from the bottom of the stack by flexing them slightly. A rack formed partially of guide bars 19 forms the immediate support for the stack and may be removed through means not shown so that it can be replaced with racks of different sizes.

A forming head, generally indicated at 20, is disposed in a position at 90° from the hopper 15 and has the function of receiving a flat carton blank, bending its end walls and side walls upwardly and securing it in a set-up position. A conveyor, generally indicated at 21, is disposed with its receiving end at a position 90° from the position of the forming head 20 and comprises two chains, one of which is shown at 22 trained over suitable sprockets and carrying between them bars 23 which advance the set-up cartons over a conveyor ramp illustrated at 24 so that the cartons, one of which is shown at 25, will be discharged to a further conveying mechanism, not shown, for delivery to any desired point.

In operation of the machine as it has been thus far described, the head 11 is indexed or advanced in steps of 90° with each set of racks 14 carrying the suction cup mounting plates 13 moving outwardly and attaining its full outward position just after the head comes to rest. During the dwell position and after the carton is formed and before the head again starts to rotate, the suction cups start to move inwardly.

As illustrated in Fig. 1, the head 11 is in its dwell position with one set of suction cups receiving a carton blank from the hopper 15. The next set of suction cups disposed in a counter-clockwise direction is depositing a blank, not shown, on the forming head where it is completely formed during the dwell position and while it is firmly held in place by suction. In the next position, the suction has been released and the carton has been ejected onto the conveyor 24. The fourth and last position illustrates the suction cups in an idle or intermediate portion of the cycle.

Figure 2:
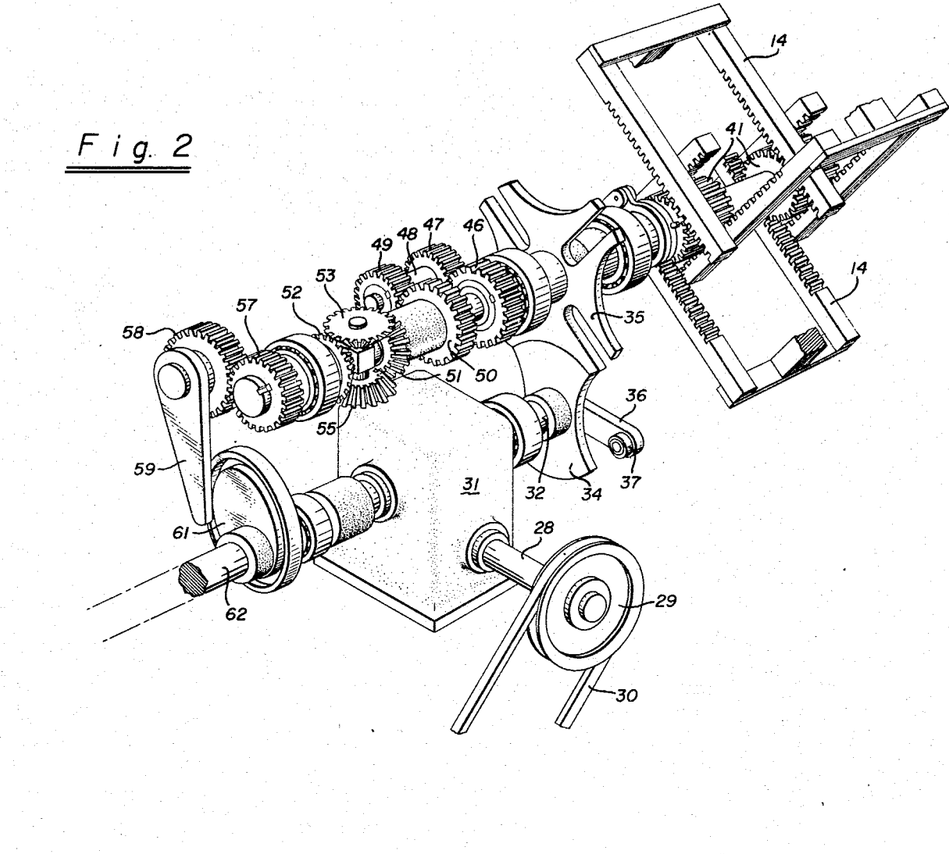
Fig. 2 is a perspective view of a portion of the main drive of said machine.
Figure 3:
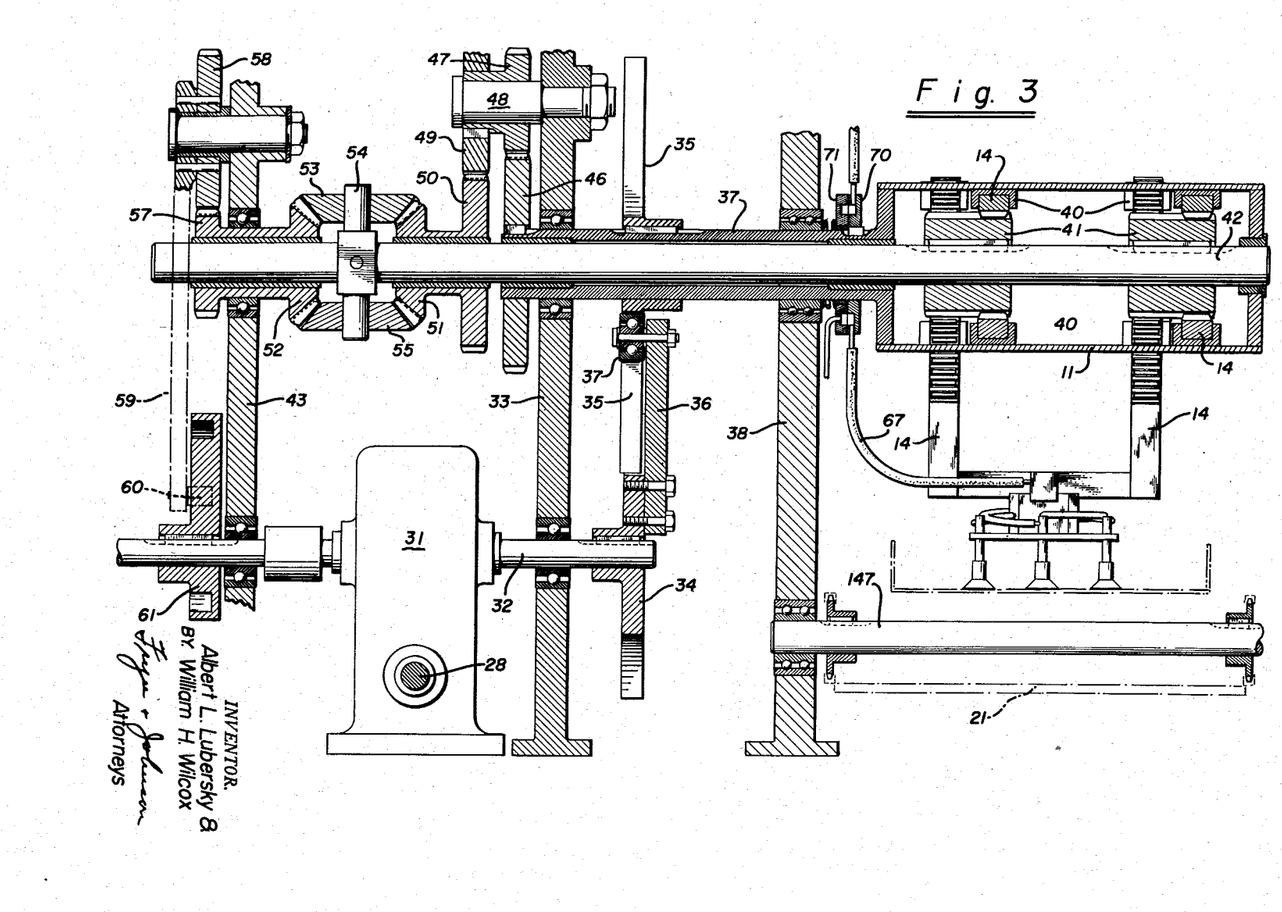
Fig. 3 is a central vertical sectional view through the drive means illustrated in Fig. 2 illustrating other parts associated therewith.

The drive mechanism for the rotary head 11 and the rack bars 14 is illustrated in Figs. 2 and 3. In these figures, a motor, not shown, drives a shaft 28 through a sheave 29 and belt 30 in a conventional manner. The shaft 29 is the input shaft for a reduction gearing contained in a housing 31 which has two output shafts, one being shown at 32. This shaft is journaled in a suitable bearing in a frame part 33 and carries the drive element 34 of a Geneva which includes the driven member 35 and a drive arm 36 with a roller 37 thereon for cooperation in the usual manner with the slots of the driven member. The driven member 35 of the Geneva is fixed to a hollow rotatable shaft 37 suitably journaled in the frame member 33 and the frame member 38 and supports the rotary head 11 at its outer end. The design of the Geneva is such as to index the head 90° at a time with dwell periods intervening between each indexing movement. The rack bars 14 are mounted for sliding movement against the inner walls of the head 11 in guides 40. All of the racks mesh with gears 41 fixed to a shaft 42 which is concentrically guided in the hollow shaft 37 and supported at its opposite end by a bearing in another frame part 43. This shaft drives the gears 41 either faster, slower or at the same speed as the head 11 so that the relative movement effects advancing, retracting and dwelling of the racks during the intermittent movement of the head.

The drive of the shaft 42 is effected through a gear 46 fixed to an end of the hollow shaft 37 meshing with a gear 47 on a stub shaft 48. The gear 47 is one of a cluster including a gear 49 meshing with a gear 50 formed integrally with a bevel gear 51 of a differential. This differential includes a second bevel gear 52 and a pair of spider gears 53 rotatable on a spider 54 which is pinned to the shaft 42.

With this arrangement, the motion and speed of the gear 52 of the differential controls the motion and speed of the shaft 42 and gears 41 which actuate the racks 14. For example if the gear 52 rotates in the same direction and at the same speed as the gear 51, the spider gears 53 and 55 do not rotate on their axes but impart rotation to the spider 54 and the shaft 42. Also by virtue of the differential action, the gear 52 may be rotated in the opposite direction from that of the gear 51 and at a speed to rotate their spider gears 53 on their axes without imparting movement to the spider 54 and thus holding the shaft 42 against rotation. Thus the speed and direction of movement of the gears 51 and 52 act through the differential to control speed and direction of the shaft 42 relative to head 11 and thus to control the reciprocating action of the racks 14. The gear 52 is controlled by a cam in the following manner. This gear is formed on a common hub with a gear 57 meshing with a gear 58 which carries a cam lever 59. A roller 60, see Fig. 3, on the end of this lever rides in the groove of a box cam 61 fixed to a shaft 62 which is the second output shaft of the gear reduction mechanism contained in the housing 31. The contour of the groove in the box cam 61 is such as to control the advancing and retracting movement of the racks 14 during the motion of the rotary head 11 so that they are extended during the dwell period and at least partially retracted before the head 11 is indexed to its next position.

Figure 4:
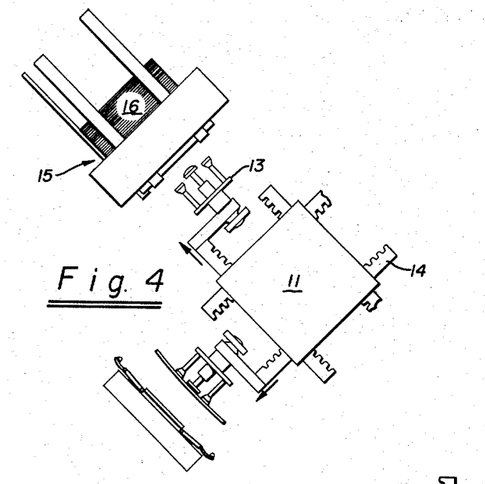
Figs. 4 to 8, inclusive, are schematic views in front elevation of the rotary head which carries the carton blanks illustrating its movement between several positions required for the complete formation and discharge of a carton.
Figures 5, 7, 8:
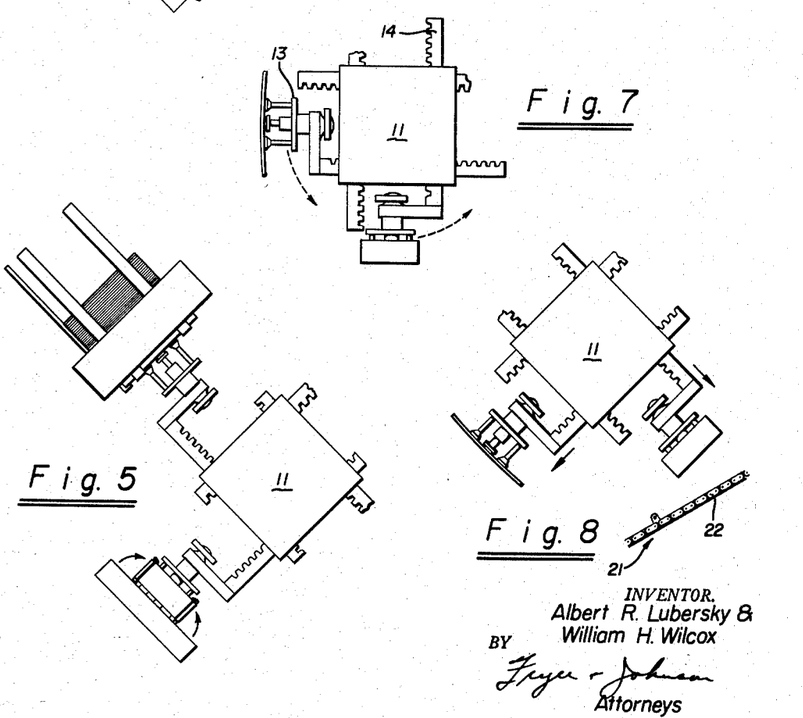
Figure 6:
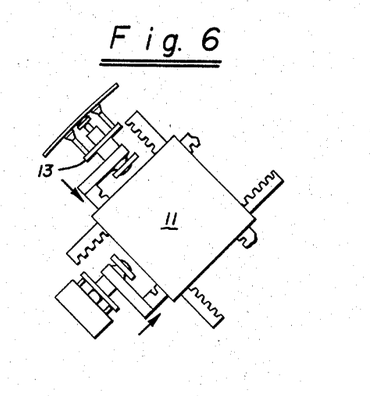

The operation of the head 11 and the racks 14 which carry the suction cup mounting plates 13 is illustrated in Figs. 4 to 8, inclusive. In these figures, the take-off position is that illustrated at the upper left side, the forming position is illustrated at the lower left, the delivery position at the lower right and the idle position at the upper right. In Fig. 4 the take-off position is shown with the racks approaching the hopper 15 to remove a carton blank from the bottom of the stack 16. At the forming station, a blank previously picked up is being advanced toward the forming head, the fully extended position of the racks in this case being illustrated in Fig. 5. In Fig. 6, the end of the retraction cycle of the rack is illustrated and Fig. 7 shows the head partially rotated in a counter-clockwise direction as it approaches the position illustrated in Fig. 8 where the carton blank which has been picked up from the Fig. 5 position is being advanced toward the forming head and the carton formed in the Fig. 5 position is being discharged toward the conveyor 21.

Figures 9, 10, 11, 12, 13:
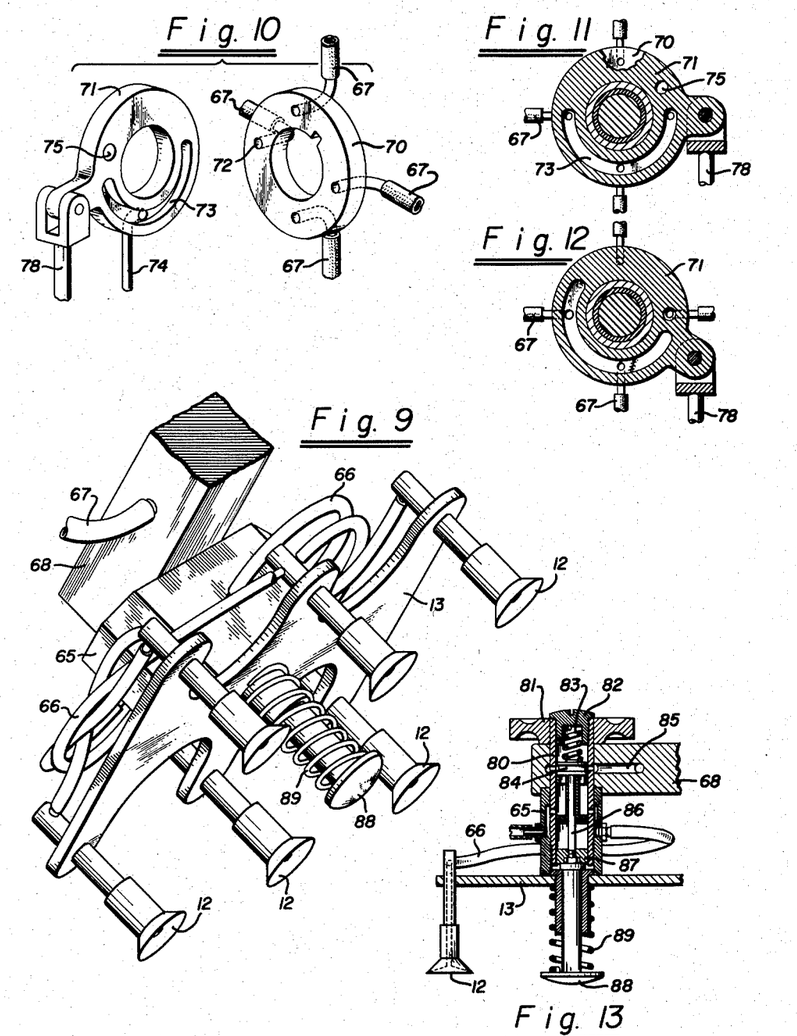
Fig. 9 is an enlarged perspective view of a group of suction cups illustrating their disposition on a mounting plate by which they are carried.
Fig. 10 is a separated view of a valve employed for selectively communicating vacuum and atmospheric pressure to several groups of suction cups such as those shown in Fig. 9.
Fig. 11 is a sectional view of the valve illustrated in Fig. 10.
Fig. 12 is a view like Fig. 11 with the valve parts illustrated in a different phase position.
Fig. 13 is a fragmentary sectional view illustrating the construction of a plunger actuated valve associated with the suction cups illustrated in Fig. 9.

In Fig. 9 of the drawings which shows the suction cups 12 and the mounting plate 13 therefor, a vacuum chamber 65 is illustrated and disposed behind the mounting plate 13 and having hoses 66 connecting it with each of the vacuum cups 12. The vacuum box 65 is evacuated from any suitable source such as a constantly actuated pump and vacuum chamber not shown, connected as by a hose 67 with a supporting arm 68 which supports and is in communication with the vacuum box 65.

It is desirable that each battery of vacuum cups be connected with the vacuum chamber just before it reaches the take-off position where it is to strip a blank from the bottom of the stack in the hopper and that this vacuum be maintained until the discharge position. This is controlled by a valve in the vacuum line 67 which valve is illustrated in Figs. 10 to 12, inclusive. The valve comprises a pair of facing discs 70 and 71. The disc 70 is keyed to and rotates with the hollow shaft 37, see Fig. 3, and has four ports 72 each connecting with one of the hoses 67 which communicates with the separate batteries of vacuum cups. The other disc 71 is rotatably mounted with respect to the hollow shaft 37 and is in face to face sealing contact with the disc 70. This disc 71 has an elongated arcuate groove 73 formed therein which communicates with the main source of vacuum by a suitable orifice and conduit 74. The normal relative position of the two discs is that illustrated in Fig. 11 with the groove 73 communicating vacuum to three batteries of suction cups and the ungrooved portion of the disc closing the communication of vacuum to the fourth battery of cups which would be the one in the idle position.

Since the battery of suction cups at the discharge position must be vented to atmosphere just prior to their leaving that position, the valve disc 71 is adapted to be oscillated to bring an atmosphere port 75 into registry with the vacuum conduit 67 at the proper time. This is accomplished by means of a connecting rod 78 which is cam actuated in a manner presently to be described for venting the vacuum cups and releasing the formed carton at the proper time in the cycle.

It is also desirable that each battery of vacuum cups be separately valved so that they could not create a vent in the system at any time when they are not in actual contact with the surface of a carton blank. This is accomplished by plunger actuated valves shown in Figs. 9 and 13 and carried one on each of the mounting plates 13. Each valve comprises a cylinder 80 which extends through the support arm 68 and vacuum box 65 and has a handle 81 by means of which it may be threaded at its lower end into the vacuum box to hold it in place and permit its ready removal when it is desired to exchange the battery of suction cups with one of a different size. The upper end of the cylinder 80 is closed by a plug 82 which serves as a seat for a spring 83 and this spring depresses a valve 84 to open communication between a vacuum passage 85 in the support arm 68 and the hoses 66 which communicate with the suction cups 12.

The valve has a stem 86 thereon with a guide member 87 at its lower end in a position to be engaged by a reciprocable plunger 88 which is spring urged toward a fully extended position by a spring 89. The end of the plunger 88 projects beyond the faces of the suction cups 12 in each battery and when a battery of suction cups is advanced toward the hopper, the plunger engages the central portion of the bottom carton blank in the hopper and is depressed moving the valve 84 inwardly and thus opening communication between the vacuum port 85 and the hoses 66 which communicate with the vacuum cups. The vacuum is sufficient to hold the carton blank against the cups and to maintain the plunger in its depressed position against the force of springs 89 and 83. However, when the carton has been formed and is ready for discharge, the admission of atmosphere to the battery of cups which support the carton breaks the vacuum and the springs 89 and 83 assist in ejecting the carton toward the discharge conveyor. The spring pressed plunger 88 serves another function when the vacuum cups are first brought into contact with the carton blank in the hopper as it exerts a central force which bends the carton blank slightly and facilitates its removal from behind the small lugs 18, shown in Fig. 1, which serve to retain the stack of cartons in the hopper.

Figure 14:
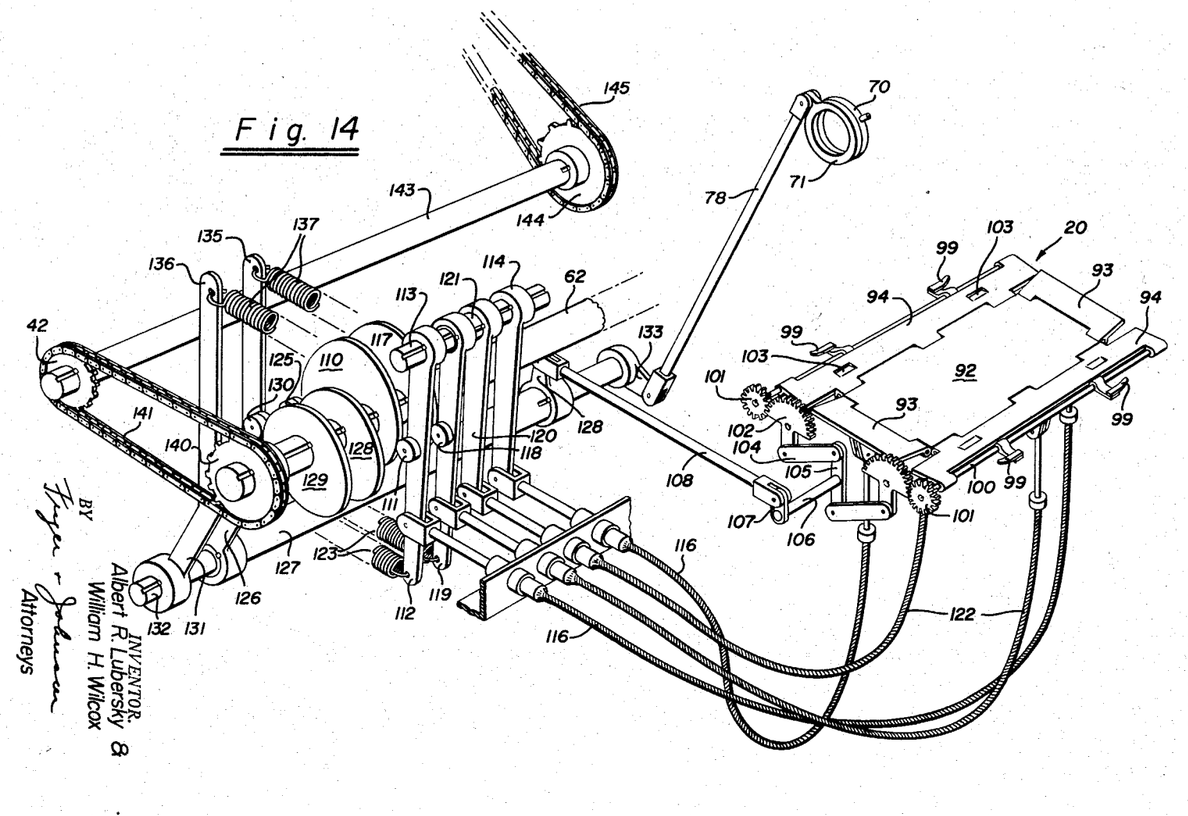
Fig. 14 is a perspective schematic view of a portion of the drive mechanism employed in actuating several of the mechanical parts of the machine.

The operation of the forming head 20 is illustrated in Figs. 14 to 22, inclusive, reference being made first to Fig. 14. In this figure, the forming head is illustrated as having a generally rectangular bottom plate 92 against which the bottom section of the carton blank is disposed and as having end wings 93 hinged to the ends thereof and side wings 94 hinged to the sides thereof, all of which swing upwardly in the operation of setting up the ends and side walls of the carton. The end walls of the carton, shown at 93a in Fig. 15, have extensions with tabs 95 thereon adapted to interlock with slits 96 formed in the side walls shown at 97. The upward swinging movement of the side wings 94 slightly precedes the upward swinging movement of the end wings 93 so that the extensions on the end walls 93a will lie outside of the side walls and the tabs 95 will enter the slits 96 from the outside. Each of the side wings 94 carries a pair of fingers 99 fixed to a shaft 100 carried for rotation at the upper or outer edge of the side wing and having a gear 101 fixed to one of its ends. The gears 101 mesh with quadrants 102 which are normally stationary but may be oscillated about their own axes in a manner and for a purpose presently to be described. When the side wings 94 are swung upwardly, the gears 101 travel over the quadrants 102 by which they are rotated to swing the fingers 99 inwardly of the side walls until the ends of the fingers engage the side walls 97 of the carton blank adjacent the slits 96 to depress one side of the slit outwardly of the carton wall and into a depression 103 of which there are four appropriately located on the side wings 94. This enables the tabs 95 to enter the slits easily as the end walls 93a attain their perpendicular position. The quadrants 102 are connected as by links 104 to a double ended crank arm 105 on a shaft 106 supported in a suitable bearing, not shown. The shaft 106 has a crank arm 107 at its opposite end for actuation by a connecting rod 108.

Figure 15:
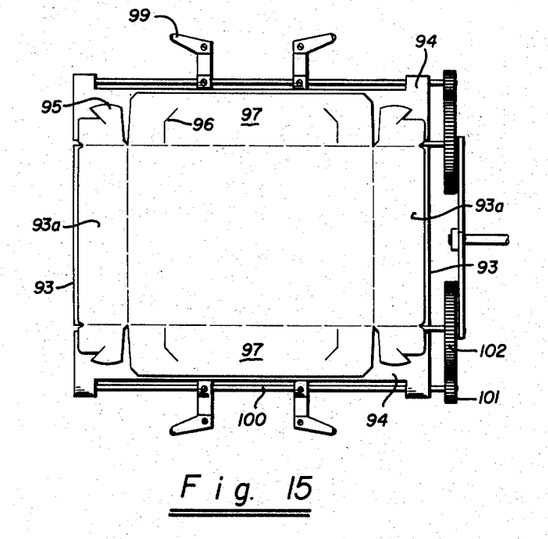
Fig. 15 is a plan view of a forming head shown in flat or open position which performs the function of setting up the walls of the carton.
Figure 16:
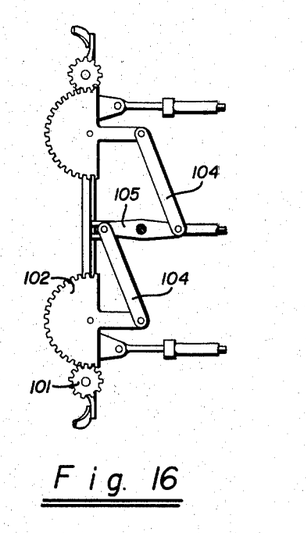
Fig. 16 is a view in side elevation of the forming head shown in Fig. 15.
Figure 17:
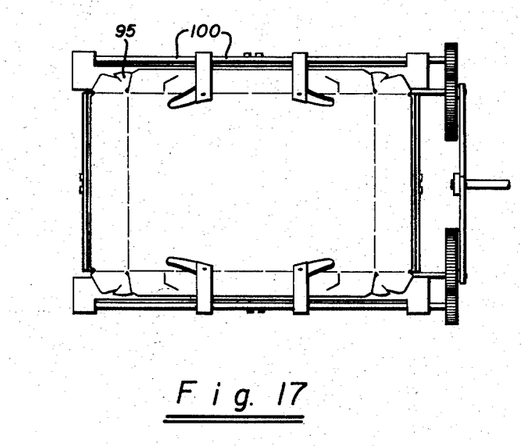
Figs. 17 and 18 are views like Figs. 15 and 16 illustrating the forming head during closing movement.
Figure 18:
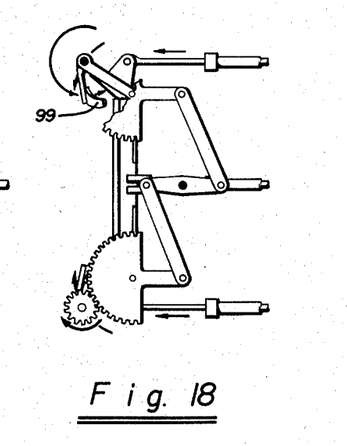
Figure 19:
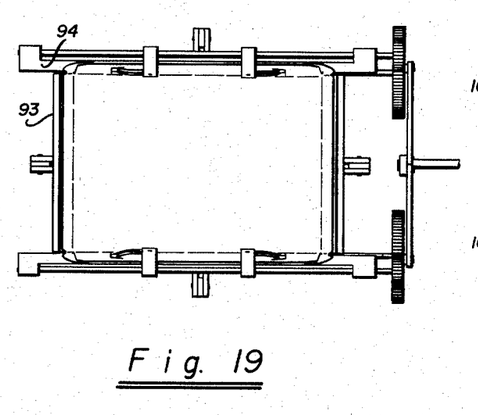
Figs. 19 and 20 are similar views with the forming head fully closed.
Figure 20:
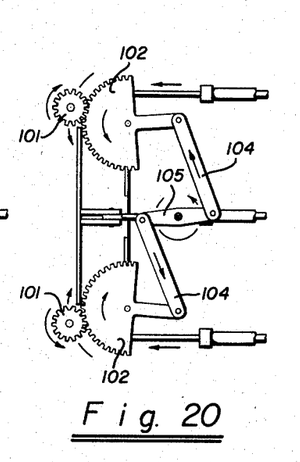
Figure 21:
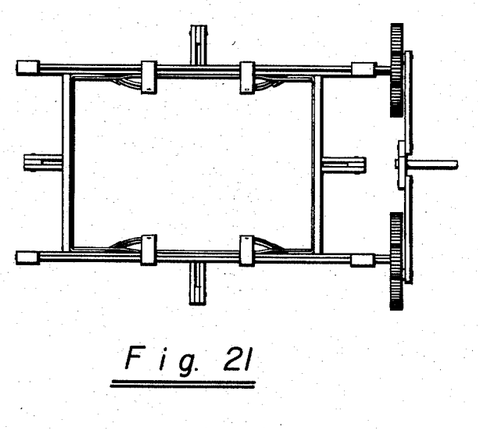
Figs. 21 and 22 are similar views illustrating action just prior to the opening of the forming head.
Figure 22:
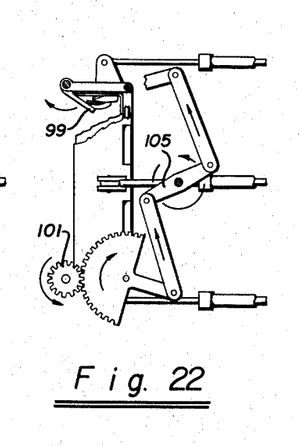
Figures 23, 24:
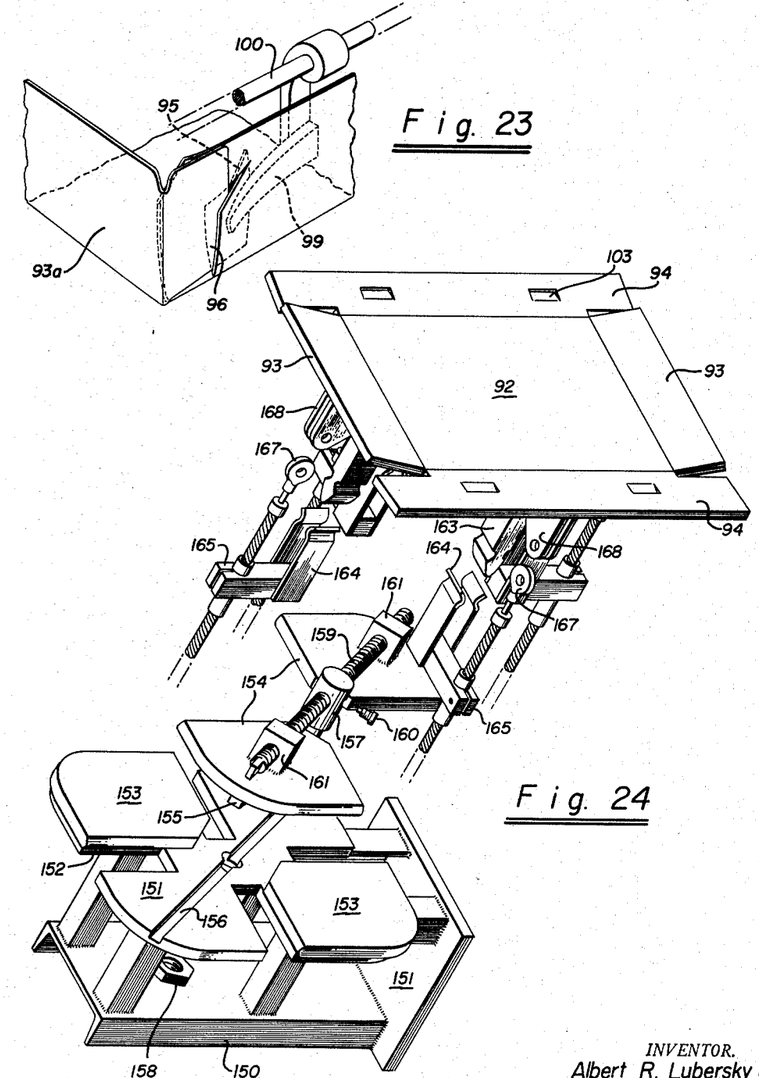
Fig. 23 is an enlarged fragmentary perspective detail illustrating the action of a tucking finger associated with the forming head.
Fig. 24 is an enlarged schematic perspective view of the forming head and mounting mechanism therefor which enables quick interchangeability of forming heads of different sizes.

Several positions assumed by the parts of the forming head in setting up a carton are illustrated in sequence in Figs. 15 to 22, inclusive. Figs. 15 and 16 show the positions of the parts with the side and end wings in the same plane as the bottom plate 92 as for example when the carton blank has just been placed against them. In Figs. 17 and 18, all of the wings 93 and 94 are moving upwardly toward their perpendicular position with the tabs 95 just starting to enter behind the side walls. As shown in Fig. 18, the gears 101 are riding over the quadrants 102 to rotate their shafts 100 and swing the tucking fingers 99 toward their final innermost positions. In Figs. 19 and 20, the end wings and side wings 93 and 94 are nearly perpendicular to the bottom plate and since it is time for the tabs 95 to enter the slits 96, the fingers 99 have depressed the side walls adjacent the slits to permit this entry. Not only do the tabs enter the slits which are now open, as illustrated in Fig. 23, but they enter in front of the fingers 99 so that upon retraction of the fingers, the tabs are given a final flip inwardly of the carton to insure a positive interlock. Referring again to Fig. 20, which illustrates the position of the parts after the side and end wings have attained their perpendicular position, the arrows thereon indicate that at this moment the double ended crank arm 105 has commenced rotation in a counterclockwise direction so that through the links 104 and quadrants 102 the gears 101 start to rotate in a direction opposite to the direction of rotation previously imparted to them by their movement over the quadrants. At this instant rotation of the gears 101 reverses the movement of the tucking fingers 99. As illustrated in Figs. 21 and 22, further movement of the double ended crank arm 105 effects further reverse rotation of the gears 101 and the tucking fingers are retracted from their tucking position while the carton is still held in its set-up position by the end wings and side wings. This, as previously stated, flips the tabs 95 inwardly of the carton and insures removal of the tucking fingers before the carton is released from its set-up position so that the tabs cannot escape from the slits 96 before the carton is discharged.

The actuating mechanism for the parts just described is illustrated in Fig. 14 wherein an extension of the shaft 62, shown in Fig. 2, is shown as carrying four cams; one cam 110 acts on a roller 111 on an arm 112 keyed to a shaft 113. There is another arm 114 keyed to the same shaft and the arms 112 and 114 are connected to Bowden cables 116 connected, as illustrated, with the end wings 93 of the former head to raise and lower the wings in timed sequence with the operation of the machine. A second cam 117 acts in the same manner on a roller 118 carried by an arm 119 which, with a similar arm 120, is keyed to a hollow shaft 121 carried for relative rotation on the shaft 113. Bowden cables 122 lead from these arms to the end wings 94 of the former head to function in the manner described in connection with the wings 93. Springs 123 are connected with the cam actuated arms 112 and 118 to effect downward or return movement of the overhead wings and to hold the rollers in engagement with the cams.

A third cam 124 acts on a roller 125 of an arm 126 carried on a hollow shaft 127. At its opposite end this hollow shaft has a crank arm 128 pivotally connected to the connecting rod 108 which oscillates the shaft 106 and double ended crank arm 105 to effect the retraction of the tucking fingers 99 in the manner and at the time described.

A fourth cam 129 acts on a roller 130 of an arm 131 keyed to a shaft 132 in the hollow shaft 127. At its opposite end the shaft 132 carries a crank arm 133 to reciprocate the connecting rod 78 which actuates the vacuum valve element 71 as also previously described. Each of the arms 126 and 131 which are straight have spring anchors 135 and 136, respectively, extending from them at an angle to receive the ends of a pair of springs 137 to hold the rollers against the cams and impart reverse movement to the parts actuated by the cams.

At the end of the shaft 62 a sprocket 140 drives a chain 141 trained over a sprocket 142 on a counter shaft 143. This counter shaft also drives a sprocket 144 and chain 145 which actuates the discharge conveyor 21 through a sprocket 146 on the drive shaft 147 of the conveyor as illustrated in Fig. 3.

The mounting of the former head which enables quick interchangeability thereof is illustrated in Fig. 24 where a bracket structure 150 is shown as carried by a plate 151 welded or otherwise secured to the front face of the main case 10 of the machine. The bracket 150 carries a generally rectangular base plate 151 with a slot 152 in each of its four edges. Two quarter plates 153 are secured permanently to the base 151 and similar quarter plates 154 rest upon the other diagonal corners and are guided for sliding movement in a diagonal direction by splines, one of which is shown at 155, permanently secured to their lower surfaces and guided in the groove 156 in the base plate. A center post 157 is threaded into the bracket 150 and locked in place as by a nut 158. A right and left hand threaded screw 159 is journaled for free rotation in the post 157 and held against endwise movement by a stud 160 which enters a groove, not shown, in the center of the threaded rod 159. The right and left hand threaded ends of the rod 159 extend through lugs 161 welded to the top surfaces of the quarter plates 154. Rotation of the rod 159 therefore advances and retracts the quarter plates 154 toward and away from the center of the base plate 151 to open and close the spaces between the four quarter plates, which spaces are directly above the slots 152 in the base plate. Extending downwardly from the bottom plate 92 of the former head are four notched pins, two of which are shown at 163 which fit into spring clips 164 connected by brackets 165 to the Bowden cables which actuate the side and end wings of the former head. With the notched pins in the clips 164, the former head is placed in a position for the clips to be engaged by the edges of the quarter plates 151 and 153 so that when the screw 159 is turned to narrow the spaces between the quarter plates, the clips are engaged by the edges of the plates and firmly held in a position to prevent removal of the former head. The end of each Bowden cable has an eye 167 to register with perforations in a bracket 168 on each of the former wings 93 and 94 and pins, not shown, are provided for completing the connection.

We claim:

1. In a carton forming machine having stations for supporting carton blanks, for setting up the blanks and for discharging the set up cartons, a rotary head with carton engaging means thereon, means to rotate the head in steps to bring the engaging means opposite said stations one at a time and means to extend and retract the engaging means toward said stations, said extending and retracting means comprising rack bars slidable through the rotary head, and gear means within the head engaging and driving said rack bars.

2. In a carton forming machine having stations for supporting carton blanks, for setting up the blanks and for discharging the set up cartons, a rotary head with carton engaging means thereon, means to rotate the head in steps to bring the engaging means opposite said stations one at a time, rack bars supporting said engaging means and meshing with gears in the head, and means to drive said gears for advancing and retracting the rack bars toward and away from said stations.

3. In a carton forming machine having stations for supporting carton blanks, for setting up the blanks and for discharging the set up cartons, a rotary head with carton engaging means thereon, means to rotate the head in steps to bring the engaging means opposite said stations one at a time, rack bars supporting said engaging means and meshing with gears in the head, and means to drive said gears for advancing and retracting the rack bars toward and away from said stations, the means for driving said gears including a differential with a set of spider gears connected with said first named gears, bevel gears meshing with the spider gears, one bevel gear being rotated with the head, and means to intermittently rotate the other bevel gear.

4. A carton forming device for setting up and interlocking hinged walls of a carton blank in which a first wall has a cut therein defining a portion deflectable to provide a locking opening into which a locking tab on an adjacent second wall is insertable, comprising a bottom member, a first former member movable relative to said bottom member and erectable to a position extending upright relative to said bottom member to set up said first carton wall, said first former member having a portion for accommodating said deflectable portion of said first carton wall, a second former member movable relative to said bottom member and erectable to a position extending upright relative to said bottom member to set up said second carton wall and move said locking tab into said locking opening, a single tucking finger adjacent said first former member in line with said accommodating portion, means mounting said finger for movement over and across the top edge of said first former member for deflecting said deflectable wall portion into said accommodating portion thereby to provide said locking opening, said finger being of such length that an end section thereof is directly engageable with said deflectable wall portion adjacent said cut whereby said end section may enter said locking opening as said wall portion is deflected thereby and hold said deflectable wall portion in said accommodating portion to provide for entry of said locking tab into said locking opening, actuating means for erecting said first former member to said upright position, actuating means for moving said finger into engagement with said deflectable wall portion when said first wall is set up whereby said locking tab may be inserted into said locking opening in front of said finger end section whereby said end section is positioned between said locking tab and said deflectable wall portion, and timed means cooperable with said finger actuating means for retracting said finger from engagement with said deflectable wall portion while said first former member is maintained stationary in said upright position whereby said locking tab is moved inwardly of said carton by said finger upon retraction thereof so that interlocking of said locking tab in said locking opening is insured before said first former member is moved away from said set up first carton wall.

5. A carton forming device for setting up and interlocking hinged walls of a carton blank in which a first wall has a cut therein defining a portion deflectable to provide a locking opening into which a locking tab on an adjacent second wall is insertable, comprising a bottom member, a first former member movable relative to said bottom member and erectable to a position extending upright relative to said bottom member to set up said first carton wall, said first former member having a portion for accommodating said deflectable portion of said first carton wall, a second former member movable relative to said bottom member and erectable to a position extending upright relative to said bottom member to set up said second carton wall and move said locking tab into said locking opening, a single tucking finger movably mounted on said first former member in line with said accommodating portion, means connected to said first former member for actuating the same to move the same to said upright position, means connected to said finger for actuating the same to move the same over and across the top edge of said first former member for deflecting said deflectable wall portion into said accommodating portion when said first carton wall is set up thereby to provide said locking opening, said finger being of such length that an end section thereof is directly engageable with said deflectable wall portion adjacent said cut whereby said end section may enter said locking opening as said wall portion is deflected thereby and hold said deflectable wall portion in said accommodating portion to provide for entry of said locking tab into said opening in front of said finger end section so that end section is positioned between said locking tab and said deflectable wall portion, means operatively connected to both said actuating means for driving the same, and timed means cooperable with said driving means and both said actuating means for retracting said finger from engagement with said deflectable wall portion while said first former member is maintained stationary in said upright position whereby said locking tab is moved inwardly of said carton by said finger upon retraction thereof so that interlocking of said locking tab in said locking opening is insured before said first former member is moved away from said set up first carton wall.

6. The carton forming device of claim 5 wherein said finger actuating means includes a first gear operatively connected with said finger and mounted on said first former member, and a second gear meshing with said first gear whereby upon movement of said first former member said first gear will pass in one direction over said second gear and move said finger into engagement with said carton wall deflectable portion, and wherein said timed means includes a movable link connected to said second gear for rocking the same to cause said first gear to pass over said second gear in a reverse direction to retract said finger.

7. A machine for setting up flat carton blanks of the type having a bottom and opposite pairs of walls hingedly connected to said bottom and extending outwardly therefrom substantially in the plane thereof, said walls having cooperating means for maintaining said walls in set up condition when said walls are moved to an upright position relative to said bottom; said machine comprising hopper means located at one station for holding a supply of such carton blanks, former means at another station for setting up said carton blanks and allowing discharge of set up cartons therefrom, and rotary carton transfer mechanism cooperable with said hopper means and said former means and mounted for movement from said hopper station to said former station, carton blank engaging means mounted on said transfer mechanism, means for rotating said transfer mechanism in steps through 360° and causing the same to dwell a predetermined time with said engaging means opposite each of said stations, means for presenting said engaging means to said carton blanks at said hopper station for withdrawing individual blanks from said hopper means, presenting such individual blanks to said former means and maintaining said blanks firmly in fixed controlled engagement with said former means while the same are being set up by said former means whereby proper registry of said blanks with said former means is maintained throughout the entire carton setting up operation.

8. A machine for setting up flat carton blanks of the type having a bottom and adjacent first and second walls hingedly connected to said bottom and extending outwardly therefrom substantially in the plane of said bottom, said walls having cooperating means for maintaining said walls in the set up condition when said walls are moved to an upright position relative to said bottom; said machine comprising hopper means located at one station for holding a supply of such carton blanks, former means at another station for setting up said carton blanks and allowing discharge of set up cartons therefrom, said former means comprising a bottom member and first and second former members hingedly connected to said bottom member and erectable to a position extending upright relative to said bottom member for setting up said carton walls, and rotary carton transfer mechanism cooperable with said hopper means and said former means and mounted for movement from said hopper station to said former station, carton engaging means comprising a plurality of suction cups mounted on said transfer mechanism, means for rotating said transfer mechanism through 360° in steps and causing the same to dwell for a predetermined time with said suction cups opposite each of said stations, means for presenting said suction cups to said supply of carton blanks at said hopper station for withdrawing an individual blank from said hopper means and for presenting said suction cups with such individual carton blank thereon to said former means, and means for maintaining suction on said cups and maintaining the bottom of said carton blank positively and directly in fixed controlled engagement with said bottom member of said former means while the first and second walls thereof are set up by said first and second former members whereby proper registry of such carton blank with said former means is maintained through the entire carton setting up operation.

9. A machine for setting up flat carton blanks of the type having a bottom and adjacent first and second walls hingedly connected to said bottom and extending outwardly therefrom substantially in the plane of said bottom, said walls having cooperating means for maintaining said walls in the set up condition when said walls are moved to a substantially upright position relative to said bottom; said machine comprising hopper means located at one station for holding a supply of such carbon blanks, former means at another station for setting up said carton blanks and allowing discharge of set up cartons therefrom, set up carton receiving means at a discharge station spaced from said former station, rotary carton transfer mechanism cooperable with said hopper means and said former means and mounted for rotation through 360°, discrete sets of suction cups at least equal in number to the number of said stations mounted on said transfer mechanism, means for effecting rotation of said transfer mechanism in steps and for causing the same to dwell for a predetermined time with a set of suction cups opposite each of said stations, means for extending and retracting said sets of suction cups toward and away from said stations whereby an individual blank may be withdrawn from said hopper means, presented to said former means, and subsequently withdrawn in set up condition from said former means and discharged from said machine at said discharge station, and suction means connected to said suction cups for maintaining engagement of such blank with said suction cups at all times during movement thereof from said hopper until the same is discharged in set up condition at said discharge station whereby such blank is maintained positively and directly in fixed controlled engagement with said former means by said suction cups while the walls thereof are set up by said former means whereby proper registry of such blank with said former means is maintained throughout the entire carton setting up operation.

10. The machine of claim 9 wherein said rotary transfer mechanism includes means cooperable with each set of suction cups for ejecting a set up carton therefrom at said discharge station.

11. A machine for setting up flat carton blanks of the type having a bottom and opposite pairs of walls hingedly connected to said bottom and extending outwardly therefrom substantially in the plane thereof, said walls having cooperating means for holding adjacent walls together in the set up condition when the walls are moved to an upright position relative to said bottom; said machine including a plurality of stations, hopper means located at one of said stations, former means located at another of said stations, and set up carton receiving means located at a discharge station, rotary carton transfer mechanism mounted for non-continuous rotation through 360° in steps equal to the number of said stations, discrete sets of suction cups mounted on said transfer mechanism, the number of said sets being at least equal to the number of said stations, means for rotating said transfer mechanism and for indexing the same so that a set of suction cups is caused to dwell opposite each of said stations for a predetermined time, means for presenting said sets of suction cups simultaneously to the respective stations opposite which they are indexed whereby a carton blank may be picked up at said hopper station by one set of suction cups while a blank previously picked up by another set of suction cups is thereby presented to and held positively and directly in fixed controlled engagement with said former means during the entire carton setting up operation while a previously set up carton is presented to said discharge station and discharged from said machine, and means for maintaining suction on said sets of suction cups at all times during movement thereof from opposite said hopper station to opposite said discharge station whereby carton blanks carried thereby are maintained in engagement therewith at all times until discharged.

12. A machine for setting up a flat carton blank of the type having a bottom and adjacent walls hingedly connected to and extending away from said bottom, comprising a hopper at a hopper station in which said blank is supported with a supply of similar blanks, a former at a carton forming station spaced from said hopper station for transforming said blank into a set up carton wherein said adjacent walls are maintained in engagement with each other, a conveyor at a discharge station for transporting said carton from said machine when set up, a non-continuously rotating carton transfer mechanism mounted for rotary movement through 360° past each of said stations, means on said transfer mechanism for engaging and holding said blank during rotation of said mechanism, means for rotating said mechanism in steps for successively indexing said blank engaging means adjacent each of said stations and for causing said transfer mechanism to dwell adjacent each station for a predetermined time when so indexed, means for presenting said blank engaging means to said hopper and subsequently to said former whereby said blank may be withdrawn from said hopper and presented to said former to be set up, and suction means connected to said suction cups for maintaining engagement of said blank with said blank engaging means at all times during movement thereof from said hopper until the same is discharged in set up condition to said conveyor whereby fixed controlled engagement of said blank with said former is positively and securely maintained during the entire setting up operation to insure proper registry of said blank with said former.

References Cited in the file of this patent

UNITED STATES PATENTS

| | | |
|---|---|---|
| 2,017,583 | Burrow | Oct. 15, 1935 |
| 2,399,934 | Monroe | May 7, 1946 |
| 2,551,476 | Vantlander | May 1, 1951 |
| 2,581,115 | Levkoff | Jan. 1, 1952 |
| 2,601,481 | Williams | June 24, 1952 |
| 2,655,843 | Baker | Oct. 20, 1953 |

UNITED STATES PATENT OFFICE
CERTIFICATE OF CORRECTION

Patent No. 2,887,022 May 19, 1959

Albert R. Lubersky et al.

It is hereby certified that error appears in the printed specification of the above numbered patent requiring correction and that the said Letters Patent should read as corrected below.

Column 9, line 1, before "end", second occurrence, insert -- said --; column 10, line 12, for "through" read -- throughout --; line 22, for "carbon" read -- carton --.

Signed and sealed this 29th day of September 1959.

(SEAL)
Attest:
KARL H. AXLINE
Attesting Officer

ROBERT C. WATSON
Commissioner of Patents